(12) United States Patent
White (10) Patent No.: US 9,396,231 B2
(45) Date of Patent: Jul. 19, 2016

(54) FACILITATING DYNAMICALLY CONTROLLED FETCHING OF DATA AT CLIENT COMPUTING DEVICES IN AN ON-DEMAND SERVICES ENVIRONMENT

(71) Applicant: salesforce.com, inc., San Francisco, CA (US)

(72) Inventor: Seth John White, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 267 days.

(21) Appl. No.: 13/923,230

(22) Filed: Jun. 20, 2013

(65) Prior Publication Data

US 2014/0067859 A1  Mar. 6, 2014

Related U.S. Application Data

(60) Provisional application No. 61/696,579, filed on Sep. 4, 2012.

(51) Int. Cl.
*G06F 17/30* (2006.01)

(52) U.S. Cl.
CPC .... *G06F 17/30483* (2013.01); *G06F 17/30507* (2013.01); *G06F 17/30424* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

*Primary Examiner* — Sherief Badawi
*Assistant Examiner* — Christopher J Raab
(74) *Attorney, Agent, or Firm* — Blakely Sokoloff Taylo & Zafman LLP (57) ABSTRACT

In accordance with embodiments, there are provided mechanisms and methods for facilitating dynamically controlled fetching of data at client computing devices in an on-demand services environment in a multi-tenant environment according to one embodiment. In one embodiment and by way of example, a method includes receiving, at a server computing device, a request from a client computing device. The request includes a query for receiving data from a database coupled to the server computing device in an on-demand database system. The method may further include matching the request against a predetermine threshold value, and where the threshold value includes a first predetermined threshold range based on a first column range or a first row range and a second predetermined threshold range based on a second column range or a second row range. The method may further include generating multiple responses to the request based on one or more formulae and the predetermined threshold value if the request fails to satisfy the predetermined threshold value.

9 Claims, 7 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065921 A1* | 3/2005 | Hrle et al. .......... 707/3 |
| 2005/0091098 A1 | 4/2005 | Brodersen et al. |
| 2005/0131914 A1* | 6/2005 | Abdo et al. .......... 707/100 |
| 2006/0106786 A1* | 5/2006 | Day et al. .......... 707/4 |
| 2006/0212429 A1* | 9/2006 | Bruno et al. .......... 707/3 |
| 2007/0061288 A1* | 3/2007 | Fuh et al. .......... 707/2 |
| 2011/0040771 A1* | 2/2011 | Gilyadov .......... G06F 13/00 707/754 |
| 2015/0088844 A1* | 3/2015 | Stigsen .......... G06F 17/30312 707/703 |

* cited by examiner

FACILITATING DYNAMICALLY CONTROLLED FETCHING OF DATA AT CLIENT COMPUTING DEVICES IN AN ON-DEMAND SERVICES ENVIRONMENT

CLAIM OF PRIORITY

This application claims priority to and the benefit of U.S. Provisional Patent Application No. 61/696,579, entitled "Method for Fetching Data to an Application Programming Interface From an On-Demand Database System" by Seth White, filed Sep. 4, 2012, and the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating dynamically controlled fetching of data at client computing devices in an on-demand services environment.

BACKGROUND

Increasing number of organizations (e.g., companies, business entities, government agencies, educational institutions, etc.) are developing application programming interfaces (APIs) to allow for various user-based applications to communicate with the organization's backend system. However, with ever-growing user interaction, organizations are unable to accommodate the increasing amounts of complex data from the organizations' backend systems without clogging the system or interrupting execution of other queries.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

In accordance with embodiments, there are provided mechanisms and methods for facilitating dynamically controlled fetching of data at client computing devices in an on-demand services environment in a multi-tenant environment according to one embodiment. In one embodiment and by way of example, a method includes receiving, at a server computing device, a request from a client computing device. The request includes a query for receiving data from a database coupled to the server computing device in an on-demand database system. The method may further include matching the request against a predetermine threshold value, and where the threshold value includes a first predetermined threshold range based on a first column range or a first row range and a second predetermined threshold range based on a second column range or a second row range. The method may further include generating multiple responses to the request based on one or more formulae and the predetermined threshold value if the request fails to satisfy the predetermined threshold value.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating dynamically controlled fetching of data at client computing devices in an on-demand services environment in a multi-tenant environment according to one embodiment. In one embodiment and by way of example, a method includes receiving, at a server computing device, a request from a client computing device. The request includes a query for receiving data from a database coupled to the server computing device in an on-demand database system. The method may further include matching the request against a predetermine threshold value, and where the threshold value includes a first predetermined threshold range based on a first column range or a first row range and a second predetermined threshold range based on a second column range or a second row range. The method may further include generating multiple responses to the request based on one or more formulae and the predetermined threshold value if the request fails to satisfy the predetermined threshold value.

Embodiments provide for dynamically controlling the amount of data that is fetched to client computing devices, via client-based APIs, from a server computing device in an on-demand database system. Stated differently, in response to a query placed by a user at a client computing device, a large amount of data being returned back to the client computing device may be optimized such that not only the request is met as largely expected by the user, but that it is done without causing any clogging in the system or interrupting smooth execution of other relatively smaller queries being received from the same or other client computing devices.

This and other similar examples may be referenced throughout the document for brevity, clarify, and ease of understanding, but it is contemplated that embodiments are not merely limited to metadata or simply generating mobile applications on mobile devices and that that other forms of data at servers in a multi-tenant database system may also be accessed or leveraged to be used for other purposes, such as generating default client views, client validation rules, client application logic, etc.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

Figure 1:
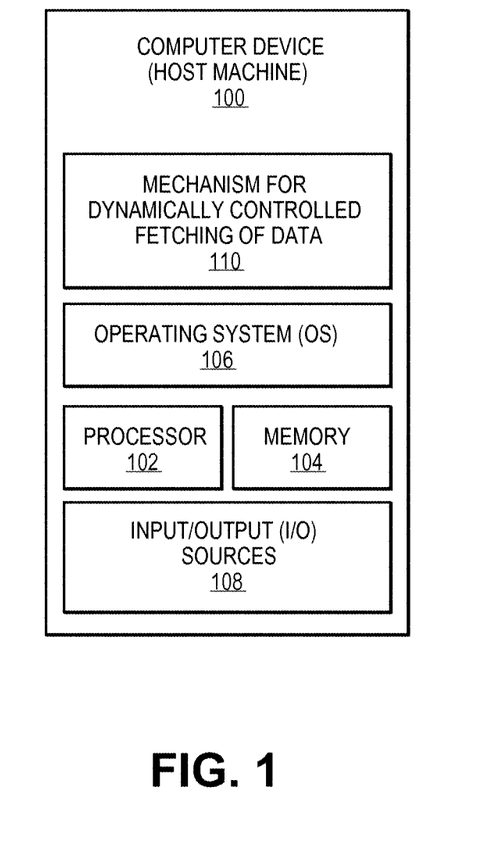
FIG. 1 illustrates a computing device employing a mechanism for dynamically controlled fetching of data according to one embodiment.

FIG. 1 illustrates a computing device 100 employing a mechanism for dynamically controlled fetching of data 110 according to one embodiment. In one embodiment, computing device 100 serves as a host machine employing mechanism for dynamically controlled fetching of data ("data fetching mechanism") 110 for facilitating controlled and optimized amount and format of data to client computing devices in a multi-tiered, multi-tenant, on-demand services environment. The term "user" may refer to a system user, such as, but not limited to, a software/application developer, a system administrator, a database administrator, an information technology professional, a program manager, product manager, etc., or an end-user, such as a representative (e.g., accountant, sales representative, finance director, human resource manager, etc.) of a customer (e.g., organization, business, company, corporation, non-profit entity, institution, agency, etc.). The term "organization" may refer to a customer or client of the service provider (e.g., Salesforce.com™, Inc.) of data fetching mechanism 110. It is to be noted that terms like "user", "customer", "organization", "tenant", "business", "company", etc., may be used interchangeably throughout this document.

It is to be noted that any references to data, metadata, computing devices (mobile computing devices, such as smartphones, etc.), software development applications and tools (e.g., Sprint Planner®, MS Project®, Chatter® Groups, etc.), etc., discussed in this document are merely used as examples for brevity, clarity, ease of understanding, and not to obscure data fetching mechanism 110; however, it is contemplated that embodiments are not limited to any particular data, metadata, computing devices, software development applications and tools, etc. For example, embodiments are applicable to any number and type of data, applications, and processes, such as customer relationship management (CRM)-based data, applications, and processes and applications (e.g., sales, accounting, customer support, marketing, technical support, etc.), etc.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion® Limited, now serving and trading as BlackBerry®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™, etc.), e-readers (e.g., Kindle® by Amazon.com®, Nook® by Barnes and Nobles®, etc.), Global Positioning System (GPS)-based navigation systems, cable setup boxes, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "application", "software application", "program", "software program", "package", and "software package" may be used interchangeably throughout this document. Moreover, terms like "job", "input", "request" and "message" may be used interchangeably throughout this document.

Figure 2:
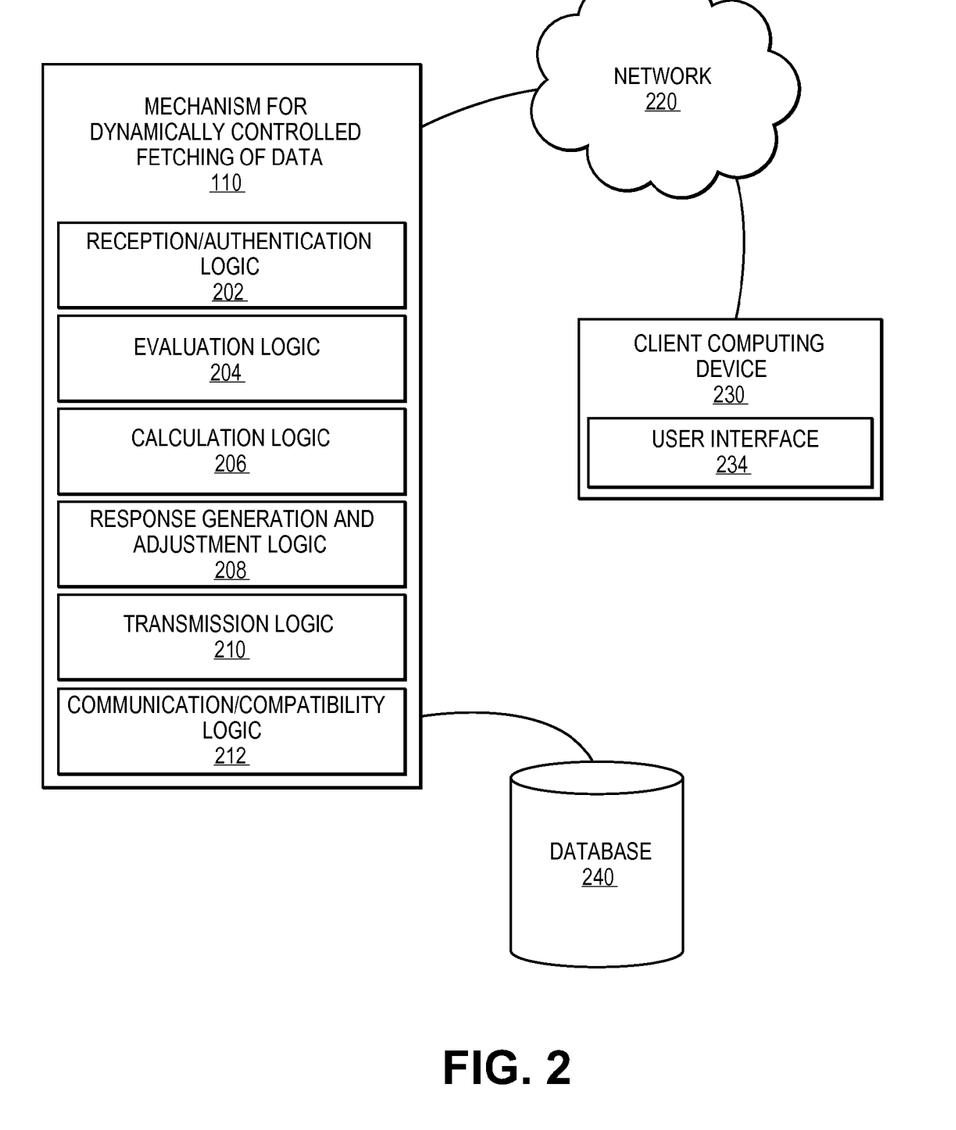
FIG. 2 illustrates a mechanism for dynamically controlled fetching of data according to one embodiment.

FIG. 2 illustrates a mechanism for dynamically controlled fetching of data 110 according to one embodiment. In one embodiment, data fetching mechanism 110 includes a number of components, such as reception/authentication logic 202, evaluation logic 204, calculation logic 206, response generation and adjustment logic 208, transmission logic 210, and communication/compatibility logic 212. Throughout this document, "logic" may be interchangeably referred to as "component" or "module" and may include, by way of example, software, hardware, and/or any combination of software and hardware, such as firmware. Further, any use of a particular word or term (e.g., hybrid back-off mechanism, etc.) should not be read to limit embodiments to devices that carry that label in products or in literature external to this document.

In one embodiment, reception/authentication logic 202 may receive a request/query for data from a user via client computing device 230. In addition to receiving the request, reception/authentication logic 202 may also perform various authentication tasks, such as authenticating the user using various user credentials (e.g., user-identification (userID), password, name, authentication number, company name, etc.), computing device 230 (e.g., public key, private key, device registration profile, etc.), the request (e.g., verifying the nature and content of the request, etc.), etc.

Upon receiving the request and performing the authentication processes, reception/authentication logic 202 may forward the request to evaluation logic 204 for evaluation of the request. In one embodiment, evaluation logic 204 may review contents of the request to determine whether the request can be satisfied in its current form. For example, the request may include a query demanding a relatively large amount of data (e.g., thousands of data sets as opposed to hundreds of data sets) having a large number of columns and rows to be fetched in response or return. The terms "return" and "response" may be used interchangeably throughout this document. In one embodiment, evaluation logic 204 may evaluate the request by matching the number of rows and/or columns anticipated in the response against a predetermined threshold number of rows and/or columns allowed by, for example, a system administrator, a software programmer, etc. For example, a system administrator may consider the bandwidth or heap limit of an on-demand database system along with other factors, such as performance factors, practical limitations, etc., such as determining a point up to which the database system can perform superior level of data management, maintain the highest level of data processing speed, and provide a seamless data query/return experience for its users, etc.

For example, large queries (e.g., Salesforce Object Query Language (SOQL)-based queries, where SOQL refers to an object query language that is used for querying data using the Force.com® platform, etc.) that require very large results having a high number of objects can often reach the heap limit of the database system, which can result in an error. To avoid such situations, in one embodiment, data fetching mechanism 110 provides for adjusting the size of large query results (e.g., by limiting a number of columns and/or rows, etc.) so that the heap limit and any potential errors can be avoided and a seamless processing of queries can be continued. However, on the other hand, it is contemplated that an end-user of an organization may have certain expectations associated with each query (e.g., expecting a minimum amount of information to be returned in a response, expecting all columns to be returned, but not all rows, etc.) and it may be important for a system administrator of the database/provider system to fulfill such expectations in order to continue to maintain good relations with the organization. It is therefore contemplated that the system administrator may take into consideration any number and type of factors, such as technological limitations (e.g., heap limit, etc.), performance factors (e.g., system performance/limitations), business/services expectations (e.g., end-user/organization expectations), etc.

As aforementioned, a system administrator at an on-demand database system of a provider may take into consideration various technological factors as well as business/service factors (e.g., an end-user typically expects to receive all or most columns but not necessarily all rows, the organization's standing with the provider, sensitivity or urgency of the data being queried, bandwidth/heap limit, other pending queries by the same and/or other organizations, etc.) to set a threshold value indicating a maximum and/or minimum number of rows and/or columns to be returned so that in response to each query, a controlled amount of data may be fetched to better accommodate any number and type of queries that are expected to return a large number or sections of rows and columns of data. In one embodiment, a formula may be formed and applied to dynamically calculate the threshold value, as will be further referenced with respect to FIG. 4, so that each query may be individually evaluated and adjusted for achieving customized, dynamic, and intelligent results as opposed to simply applying a dummy threshold number to each query. However, in one embodiment and for achieving maximum efficiency, a predetermined minimum and/or maximum integer threshold range or value (e.g., an integer number, such as 1000 rows and 2000 columns, etc.) may be set to determine whether a query qualifies to be returned as requested or needs to go through a set of calculations.

Evaluation logic 204 may match the anticipated results against the predetermined integer threshold range or value to determine whether the query qualifies to be returned as requested. If the query satisfies the threshold value, the query is processed and the results including any number of rows and columns of data are returned to the user at client computing device 230 via user interface 234. If, however, the threshold value is not satisfied, such as the return is expected to include a greater number of rows and columns than the threshold number of rows and columns, respectively, then evaluation logic 204 may forward the query to calculation logic 206.

In one embodiment, calculation logic 206 applies a predetermined formula to the query to calculate any adjustments that can be applied to optimize the results. For simplicity, for example, the threshold value allows for a maximum of 100 rows and 200 columns or, in other words, 20,000 sets of rows/columns (100 rows×200 columns), per response, but the query placed by the user demands a return of 120 rows and 160 columns (or 19,200 sets). In this case, the query may be considered valid by evaluation logic 204 and satisfied because the total number of rows/columns sets, 19,200 sets, is less than the number of sets, 20,000 sets, allowed by the threshold value even though the number of rows, 120 rows, demanded by the query is more than the number of rows, 100 rows, allowed by the threshold values. It is contemplated that any order or level of flexibility may be built into the threshold value or formula as necessitated or desired by the system administrator and/or the limitations of the database system.

Continuing with the example, if, for example, the return to the query demands 150 rows and 200 columns (or 30,000 sets), the query may be rejected by evaluation logic 204 and passed on to calculation logic 206. In one embodiment, at calculation logic 206, a predetermined formula may be applied to the query to determine the best manner in which the results may be modified so as to fetch the maximum amount of data to the user at client computing device 230 without having to interrupt query processes, compromise system resources, lower user expectations, etc. For example, since given the general nature of queries, columns tend to be more important to the user than rows and accordingly, upon calculation logic 206 performing calculation, return generation and adjustment logic 208 may adjust or modify the returns so that all 200 columns and 100 rows are prepared as a first return, while another set of 200 columns and the remaining 50 rows is prepared as a second return for achieving maximum optimization. Upon modification of the results by return generation and adjustment logic 208, the adjusted first and second returns are forwarded on to transmission logic 210 which fetches the two returns to client computing device 230 to be viewed by the user via user interface 234.

In one embodiment, calculation logic 206 includes a calculation framework to employ any number and type of configurable parameters to dynamically and seamlessly facilitate various calculation sets using any number and type of formulae as provided or requested by the user. These formulae may be based on any number and type of techniques, such as, but not limited to, hybrid multiple backoff algorithms, binary exponential backoff schemes, the Markov chain model, etc. In one embodiment, a hybrid of multiple back algorithms may be employed so that, for example, in case of multiple ranges or values, one formula may be used for a first column range and/or a row range, whereas another formula may be used for a second column range and/or row range, etc., to achieve maximum flexibility and efficiency. Further, these formulae and ranges and may be set as configurable parameters of the calculation framework of calculation logic 206 for performing continuous as well as future calculations without having to recreate or reconfigure these parameters each time a request is placed by the user. It is contemplated, however, that the user may choose to alter or modify any number and type of configurable parameters based on any number and type of calculation techniques/formulae and/or as desired or necessitated by the user, the system administrator at the organization, and/or system resources of the on-demand database system, etc.

Communication/compatibility logic 212 may facilitate the ability to dynamically communicate and stay configured with any number and type of software/application developing tools, models, data processing servers, database platforms and architectures, programming languages and their corresponding platforms, etc. Communication/compatibility logic 216 further facilitates the ability to dynamically communicate and stay configured with various computing devices (e.g., mobile computing devices (such as various types of smartphones, tablet computers, laptop, etc.), networks (e.g., Internet, intranet, cloud-computing network, etc.), websites (e.g., social networking websites, such as Facebook®, LinkedIn®, Google+®, etc.), and the like, while ensuring compatibility with changing technologies, parameters, protocols, standards, etc.

It is contemplated that any number and type of components may be added to and/or removed from data fetching mechanism 110 to facilitate various embodiments including adding, removing, and/or enhancing certain features. For brevity, clarity, ease of understanding, and not to obscure data fetching mechanism 110, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

Figure 3:
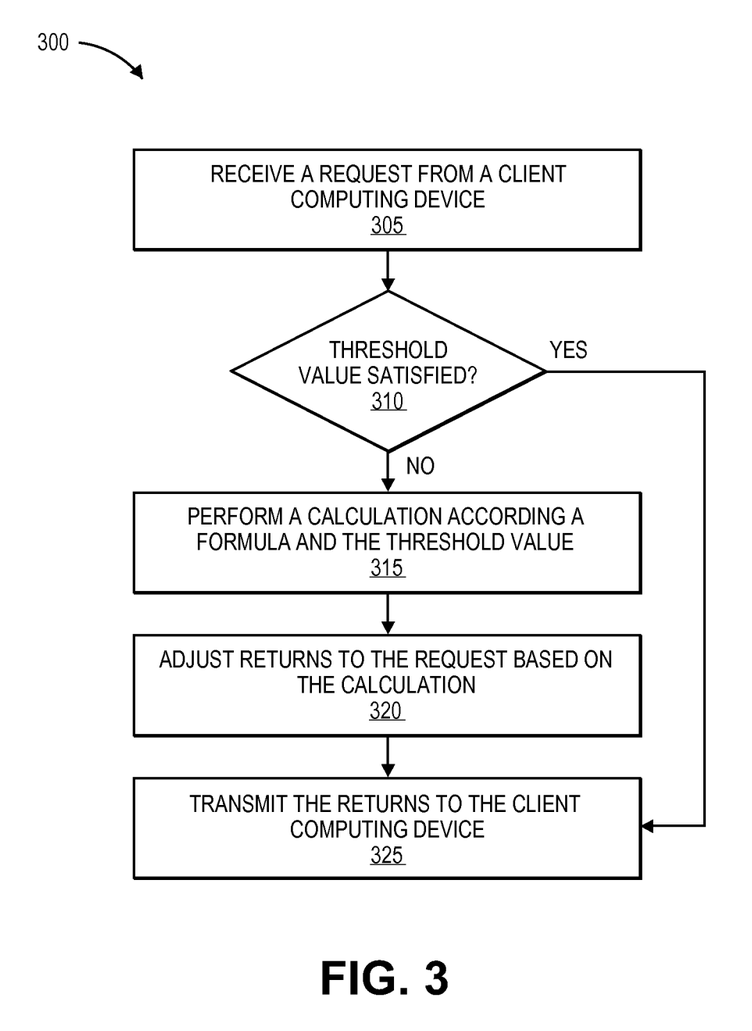
FIG. 3 illustrates a method for dynamically controlled fetching of data at client computing devices in an on-demand services environment in a multi-tenant environment according to one embodiment.

FIG. 3 illustrates a method for dynamically controlled fetching of data to client computing devices in an on-demand services environment in a multi-tenant environment according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by mechanism for dynamically controlled fetching of data 110 of FIG. 1.

Method 300 begins at 305 with receiving a request/query for data from a client computing device. The request is received at a server computing device hosting data fetching mechanism 110 of FIG. 1. The request may be placed by an end-user (e.g., a representative of an organization, such as a sales representative, a human resource director, a finance manager, etc.) using the client computing device (e.g., mobile computing device) that is in communication with the server computing device over a network (e.g., cloud network). The request may include a query for certain amount and type of data, such as human resources-related data, quarterly sales data, product-related data, etc. At block 310, the request is evaluated to determine whether it satisfies a predefined threshold criteria (e.g., a threshold value, a threshold range, etc.) as determined by a representative (e.g., a system administrator, a software developer, etc.) of the on-demand database system. If the request satisfies the threshold criteria, the request is processed by obtaining the necessary data and the results are transmitted to the client computing device at block 325.

If, however, the request does not satisfy the threshold criteria, the potential results are calculated for adjustment according to one or more formulae as predetermined by the representative of the on-demand database system at block 315. Once the adjustments have been calculated, at block 320, any necessary modifications are made in accordance with the predefined threshold criteria. As aforementioned with regard to FIG. 2, the adjustment may include splitting the response into multiple returns so that the threshold criteria is satisfied while providing ample data to the end-user and without causing any potential query bottlenecks or system clogs. At block 325, the adjusted data returns are transmitted to the client computing device for the user to view via a user interface.

Figure 4:
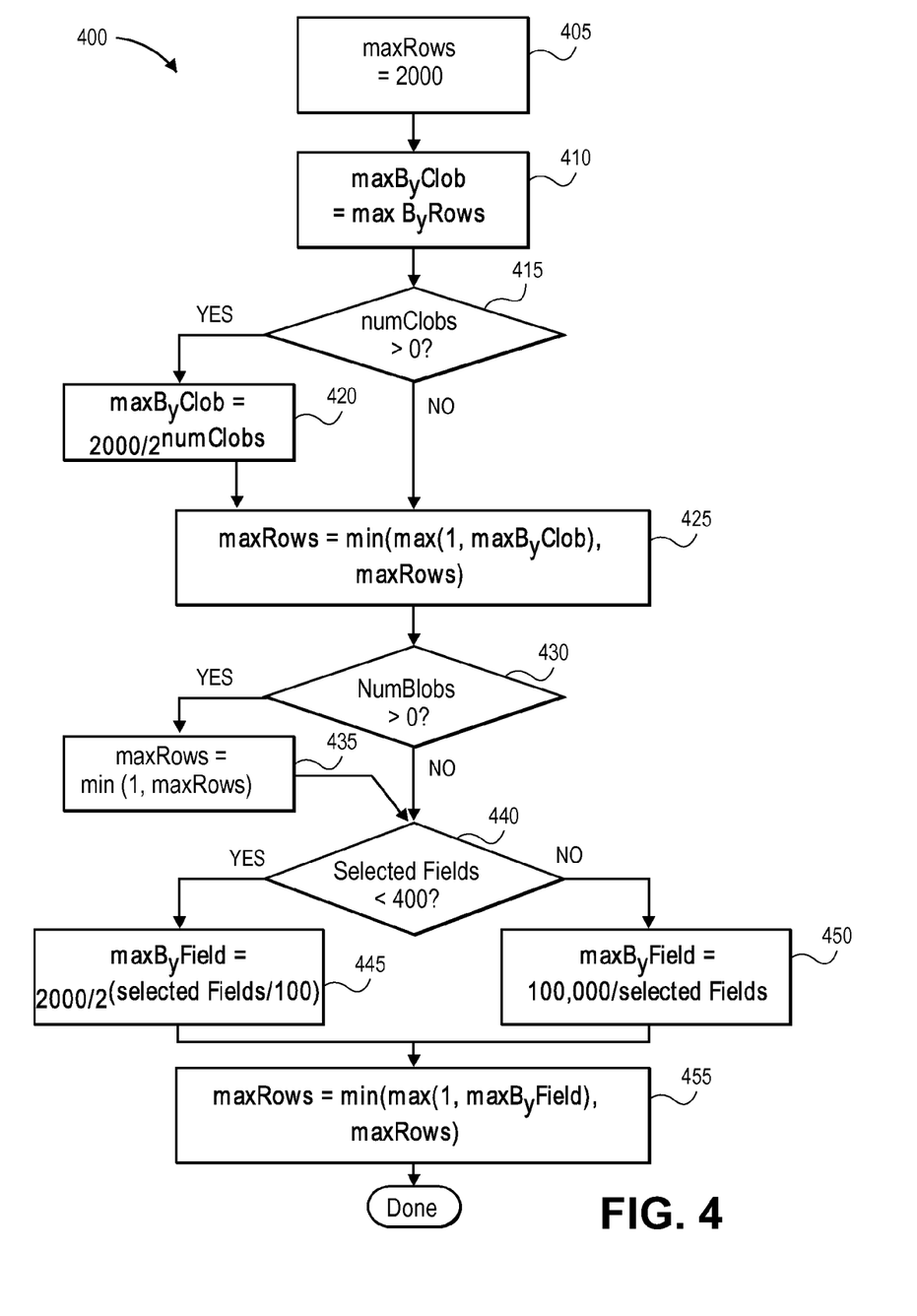
FIG. 4 illustrates a method for dynamically controlled fetching of data at client computing devices in an on-demand services environment in a multi-tenant environment according to one embodiment.

FIG. 4 illustrates a method for dynamically controlled fetching of data to client computing devices in an on-demand services environment in a multi-tenant environment according to one embodiment. In this embodiment, a novel feature provides a predefined threshold criteria in terms of a number of regular data columns and/or rows is returned that is defined and used. The predetermined criteria may be used to determine whether an exponential or linear formula is applied to calculate, for example, a number of rows returned by the initial and any subsequent requests for data. The value for the threshold may be configurable as are the particular formulae used to calculate the data rows returned. Method 400 may be performed by processing logic that may comprise hardware (e.g., circuitry, dedicated logic, programmable logic, etc.), software (such as instructions run on a processing device), or a combination thereof. In one embodiment, method 400 may be performed by mechanism for dynamically controlled fetching of data 110 of FIG. 1.

As aforementioned with respect to FIGS. 2-3, calculation logic 206 may be used to apply a predefined formula to calculate the possibility of dividing a query response into multiple returns to then be fetched to the user while complying with the predefined threshold criteria. Method 400 begins at block 405 with a set number of maximum rows being a predefined number of rows, such as 2000, according to the predetermined threshold criteria, where maxRows refers to the maximum number of rows per query return. At block 410, the maximum number of rows to return is set equal to and based on a maximum number of character large object (clob) columns, where maxByClob refers to the maximum number of rows to return based on clob columns.

At block 415, a determination is made as to whether the number of clob columns is greater than zero, where numClobs refers to the number of clob columns in result. If not, at block 425, the maximum number of rows is set to a new maximum (e.g., equaling min(max(1, maxByClob),maxRows). Here, for example, the inner term ensures that at least one row is returned while the outer term ensures that the backoff is reflected in the value outputted by the formula. If yes, at block 420, the maximum number of clob columns is set to equal, for example, $2000/2^{numClobs}$ and continues on to block 425. In other words, at block 420, an exponential backoff is performed using the number of Clob columns as a parameter.

At block 430, a determination is made as to whether the number of binary large object (blob) columns is greater than zero, where numBlobs refers to the number of blob columns in results. If yes, at block 435, the maximum number of rows are set to a number (e.g., min(1, maxRows). If not and after the maximum number of rows are set to a number, at block 440, the process continues with a determination as to whether any selected fields are greater than a predefined number of fields, such as 400. If yes, at block 445, the maximum number of fields is calculated to a first number, such as $2000/2^{(selectedFields/100)}$. Stated differently, an exponential back-off is performed using the number of selected fields as the controlling parameter and that the innermost term controls the rate of the exponential backoff to a degree using a predefined and configurable parameter value, which in this case is 100. If not, at block 450, the maximum number of fields is calculated to a second number, such as 100,000/selected Fields, where selected Fields refers to the number of selected fields and where, maxByField refers to the number of rows to return based on the number of regular fields selected. In other words, a linear backoff in the number of rows returned is performed using the number of selected fields as the controlling parameter when the number of selected fields exceeds a predefined and configurable threshold, which in this case is 400 fields. Further, the threshold for applying the linear backoff formula is chosen carefully so that a reasonable number of rows are returned for queries that select greater than 400 columns. At block 455, the maximum number of rows to return is calculated (such as to be min(max(1,maxByField),maxRows). Here, the nested term ensures that at least one row is returned, while the outer term ensures that the backoff, whether exponential or linear, is reflected in the result of the calculation.

It is contemplated that embodiments are not limited to any of the calculation sequences or formulae illustrated with reference to FIG. 4 and the calculation may be set to be performed by calculation logic 206 of FIG. 2 in any number of ways as determined by the system administrator in consideration of any number and type of aforementioned factors, such as heap limits, overall system limitations, query sizes and traffic, end-user/organizational expectations, and the like.

Figure 5:
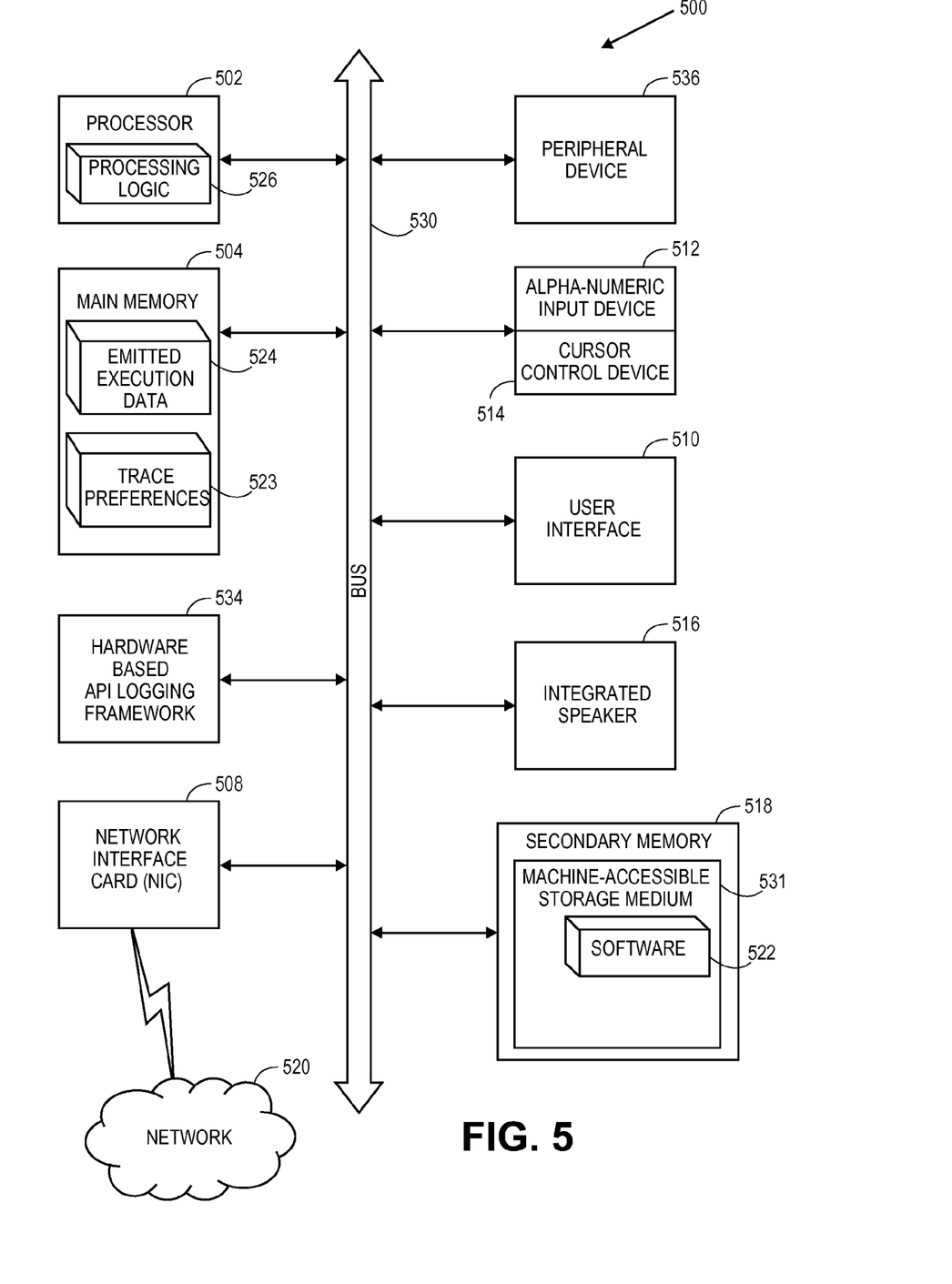
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and computing device 230 of FIG. 1 and FIG. 2, respectively. In alternative embodiments, the machine may be connected (e.g., networked) to other machines in a network (such as host machine 100 of FIG. 1 connected with client machine 230 over network 220 of FIG. 2), such as a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of data fetching mechanism 110 as described with reference to FIG. 1 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of data fetching mechanism 110 as described with reference to FIG. 1 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
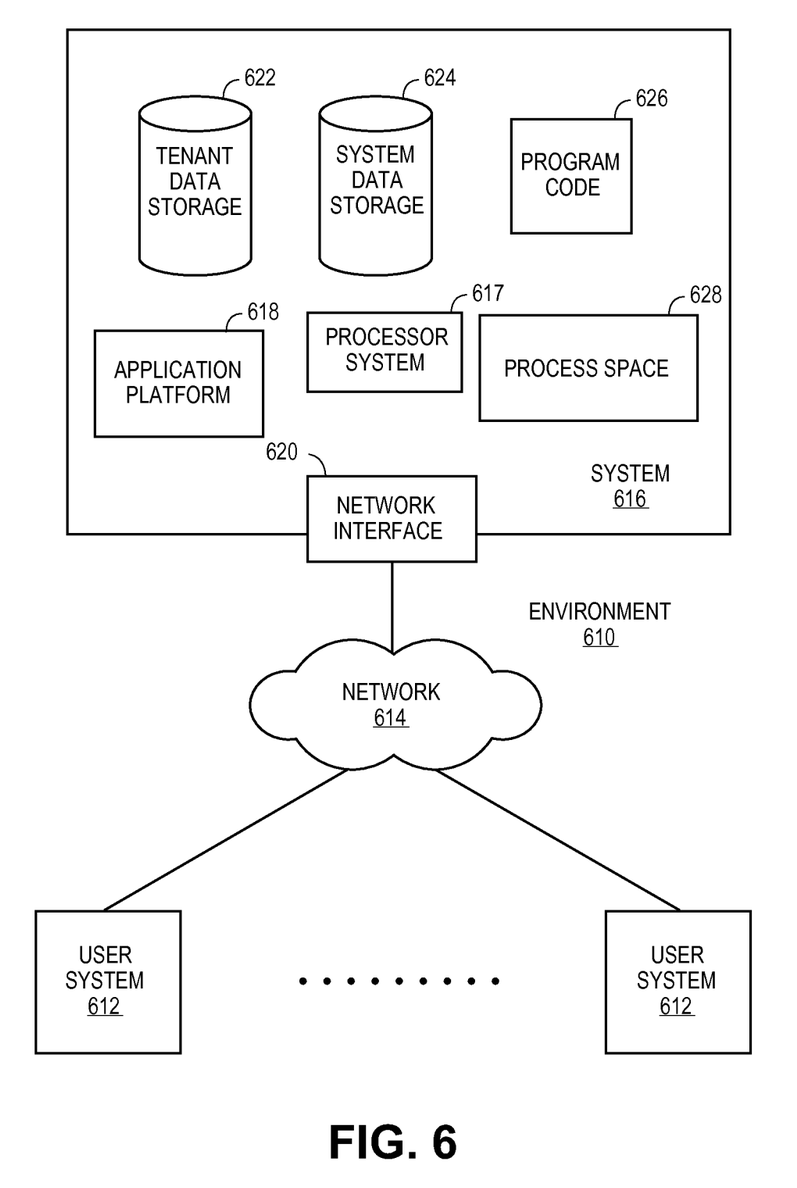
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
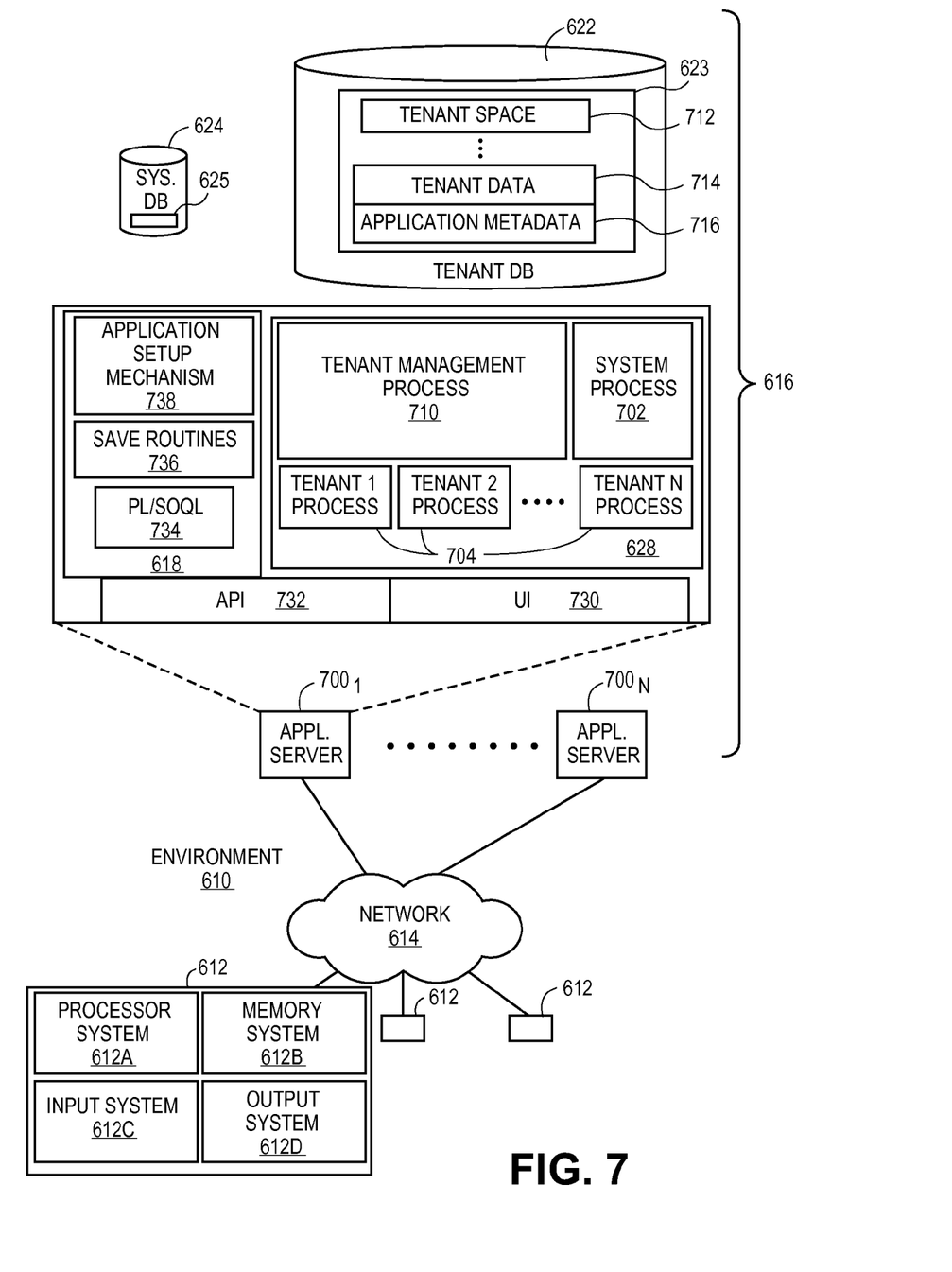
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A database system-implemented method comprising:
  receiving, by the database system, a request from a computing device that is communicatively part of a cloud network, wherein the request includes a query for receiving data from the database system, wherein the request is placed by a user having access to the computing device and representing a tenant in a multi-tenant environment; and
  evaluating, by the database system, in runtime, the request to determine whether the request satisfies a predetermine threshold value, wherein the threshold value defines a permitted range of columns and a permitted range of rows based on a query policy associated with the tenant,
  wherein if the request satisfies the predetermined threshold value, returning, by the database system, a response based on the predetermined threshold value, wherein the response is returned to the computing device,
  wherein if the request fails to satisfy the predetermined threshold value, returning, by the database system, an adjusted response to the computing device, wherein the adjusted response is generated based on one or more adjustments made, in runtime, to at least one of the permitted range of columns and the permitted range of rows, wherein the one or more adjustments are calculated such that a net adjustment to the permitted ranges of columns and rows remains in compliance with the query policy, and
  wherein the one or more adjustments are calculated using one or more formulae provided for adjusting the threshold value while remaining in compliance with at least one of the query policy and user expectations such that by at least one of limiting a number of the permitted range of columns or the permitted range of rows while avoiding a heap limit, wherein the permitted ranges of columns and rows include minimum and maximum integer values.

2. The method of claim 1, wherein the one or more formulae further consider the user expectations regarding the response or the adjusted response based on the query policy, wherein the user expectations include at least one of expecting a minimum amount of information to be returned in the response or the adjusted response, a minimum number or a maximum number of the permitted range of columns to be returned, a minimum number or a maximum number of the permitted rows to be returned.

3. The method of claim 2, wherein the one or more formulae further consider technological limitations comprising one or more of the heap limit, system bandwidth, power limitations, speed or performance limitations, other system resource limitations, business or services expectations for the tenant.

4. A database system comprising:
one or more computing devices in a multitenant environment, wherein a computing device includes a processing device coupled with a storage device, wherein the computing device performs one or more operations comprising:
receiving, by the processing device, a request from a computing device that is communicatively part of a cloud network, wherein the request includes a query for receiving data from the database system, wherein the request is placed by a user having access to the computing device and representing a tenant in the multi-tenant environment; and
evaluating, in runtime, by the processing device, the request to determine whether the request satisfies a predetermine threshold value, wherein the threshold value defines a permitted range of columns and a permitted range of rows based on a query policy associated with the tenant,
wherein if the request satisfies the predetermined threshold value, returning, by the database system, a response based on the predetermined threshold value, wherein the response is returned to the computing device,
wherein if the request fails to satisfy the predetermined threshold value, returning, by the database system, an adjusted response to the computing device, wherein the adjusted response is generated based on one or more adjustments made, in runtime, to at least one of the permitted range of columns and the permitted range of rows, wherein the one or more adjustments are calculated such that a net adjustment to the permitted ranges of columns and rows remains in compliance with the query policy, and
wherein the one or more adjustments are calculated using one or more formulae provided for adjusting the threshold value while remaining in compliance with at least one of the query policy and user expectations such that by at least one of limiting a number of the permitted range of columns or the permitted range of rows while avoiding a heap limit wherein the permitted ranges of columns and rows include minimum and maximum integer values.

5. The database system of claim 4, wherein the one or more formulae further consider the user expectations regarding the response or the adjusted response based on the query policy, wherein the user expectations include at least one of expecting a minimum amount of information to be returned in the response or the adjusted response, a minimum number or a maximum number of the permitted range of columns to be returned, a minimum number or a maximum number of the permitted rows to be returned.

6. The database system of claim 5, wherein the one or more formulae further consider technological limitations comprising one or more of the heap limit, system bandwidth, power limitations, speed or performance limitations, other system resource limitations, business or services expectations for the tenant.

7. A non-transitory machine-readable medium having stored thereon instructions which, when executed by a processor, cause the processor to perform one or more operations comprising:
receiving, by the database system, a request from a computing device that is communicatively part of a cloud network, wherein the request includes a query for receiving data from the database system, wherein the request is placed by a user having access to the computing device and representing a tenant in a multi-tenant environment; and
evaluating, by the database system, in runtime, the request to determine whether the request satisfies a predetermine threshold value, wherein the threshold value defines a permitted range of columns and a permitted range of rows based on a query policy associated with the tenant,
wherein if the request satisfies the predetermined threshold value, returning, by the database system, a response based on the predetermined threshold value, wherein the response is returned to the computing device,
wherein if the request fails to satisfy the predetermined threshold value, returning, by the database system, an adjusted response to the computing device, wherein the adjusted response is generated based on one or more adjustments made, in runtime, to at least one of the permitted range of columns and the permitted range of rows, wherein the one or more adjustments are calculated such that a net adjustment to the permitted ranges of columns and rows remains in compliance with the query policy, and
wherein the one or more adjustments are calculated using one or more formulae provided for adjusting the threshold value while remaining in compliance with at least one of the query policy and user expectations such that by at least one of limiting a number of the permitted range of columns or the permitted range of rows while avoiding a heap limit, wherein the permitted ranges of columns and rows include minimum and maximum integer values.

8. The non-transitory machine-readable medium of claim claim 7, wherein the one or more formulae further consider the user expectations regarding the response or the adjusted response based on the query policy, wherein the user expectations include at least one of expecting a minimum amount of information to be returned in the response or the adjusted response, a minimum number or a maximum number of the permitted range of columns to be returned, a minimum number or a maximum number of the permitted rows to be returned.

9. The non-transitory machine-readable medium of claim 8, wherein the one or more formulae further consider technological limitations comprising one or more of the heap limit, system bandwidth, power limitations, speed or performance limitations, other system resource limitations, business or services expectations for the tenant.

* * * * *